(No Model.) 4 Sheets—Sheet 1.

H. STOLLWERCK.
PURIFYING FEED WATER IN STEAM BOILERS.

No. 313,838. Patented Mar. 10, 1885.

Witnesses.
George W. Rea
Robert Everett,

Inventor,
Heinrich Stollwerck.
By James L. Norris.
Atty.

(No Model.) 4 Sheets—Sheet 2.
H. STOLLWERCK.
PURIFYING FEED WATER IN STEAM BOILERS.
No. 313,838. Patented Mar. 10, 1885.
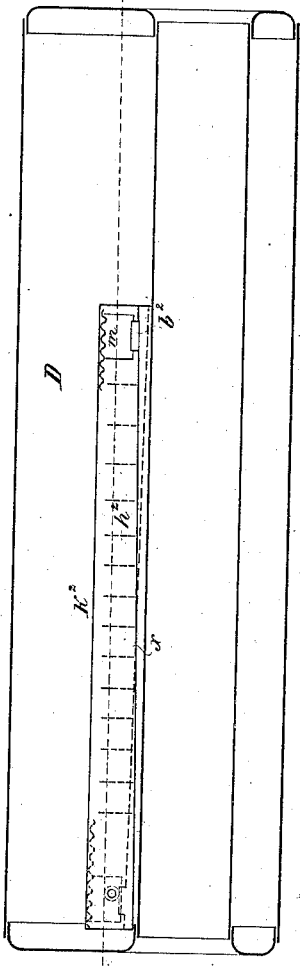
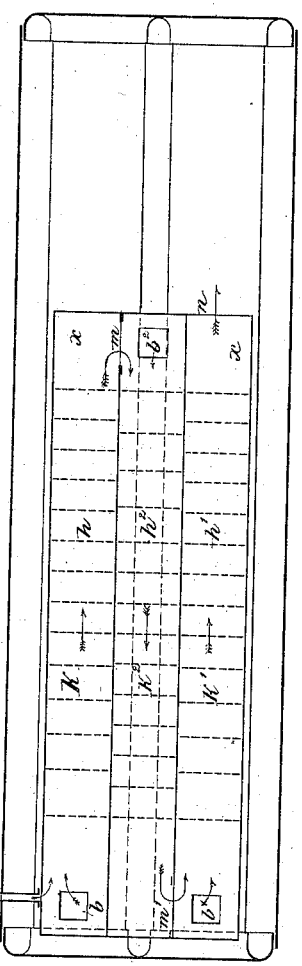
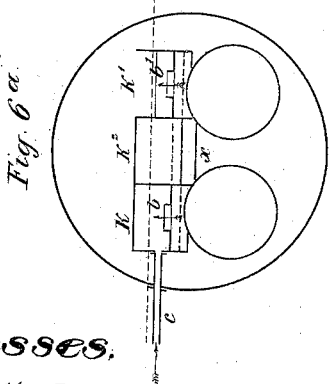

(No Model.) 4 Sheets—Sheet 3.
H. STOLLWERCK.
PURIFYING FEED WATER IN STEAM BOILERS.
No. 313,838. Patented Mar. 10, 1885.
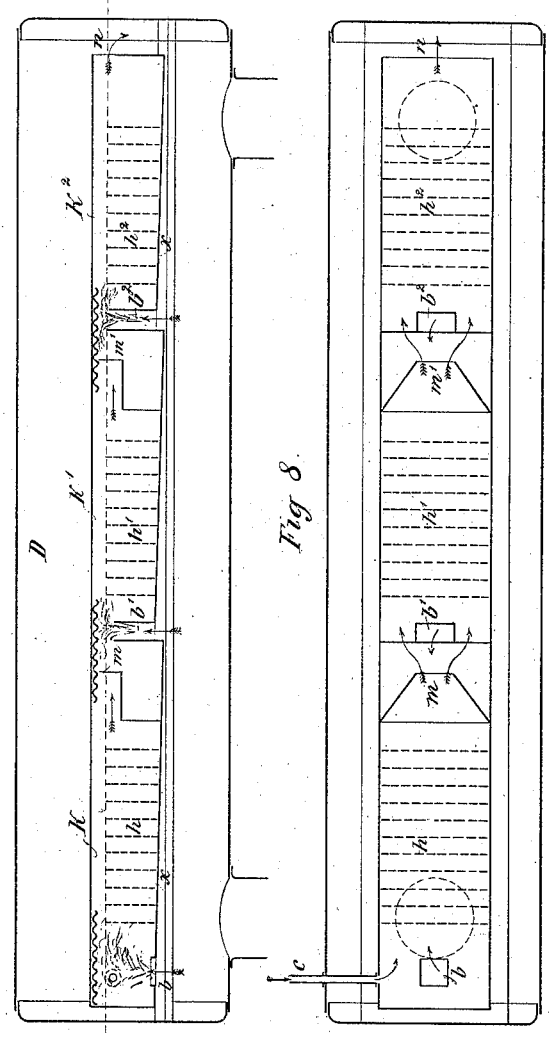
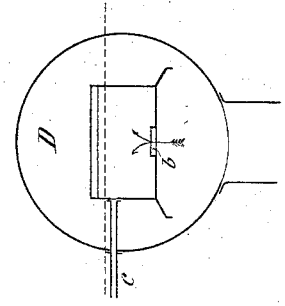
Witnesses
George W. Rea
Robert Everett
Inventor
Heinrich Stollwerck
By James L. Norris
Atty.

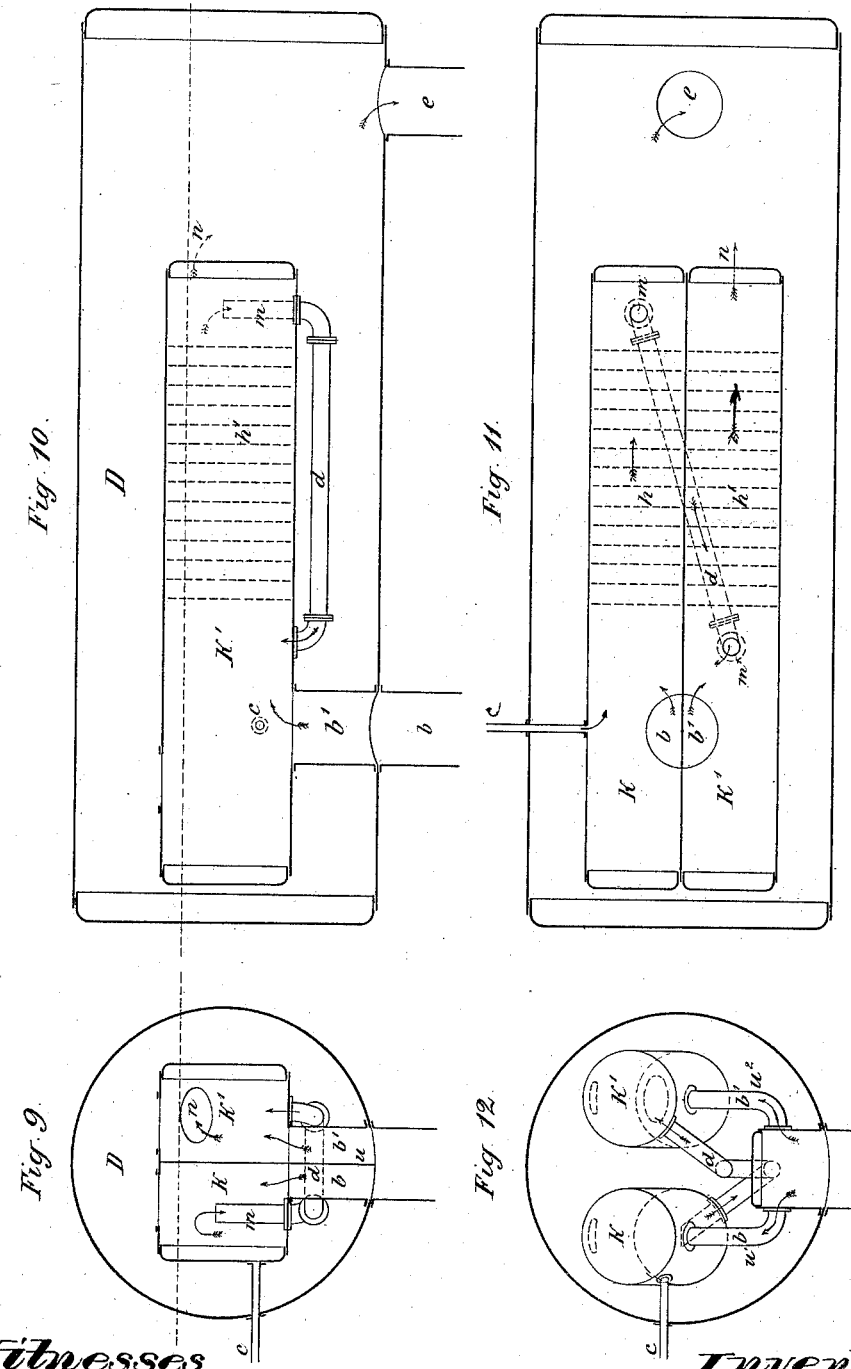

UNITED STATES PATENT OFFICE.

HEINRICH STOLLWERCK, OF COLOGNE, PRUSSIA, ASSIGNOR TO GEBR. STOLLWERCK, OF COLOGNE-ON-THE-RHINE, GERMANY.

PURIFYING FEED-WATER IN STEAM-BOILERS.

SPECIFICATION forming part of Letters Patent No. 313,838, dated March 10, 1885.

Application filed August 30, 1884. (No model.)

*To all whom it may concern:*

Be it known that I, HEINRICH STOLLWERCK, of the city of Cologne-on-the-Rhine, in the Kingdom of Prussia and German Empire, have invented certain new and useful Improvements in Purifying Feed-Water in Steam-Boilers, of which the following is a specification, reference being had to the accompanying drawings, and to the letters of reference marked thereon.

My invention relates to an improved apparatus for purifying feed-water in steam-boilers.

The object of the said invention is to provide for freeing the feed-water from impurities which are liable to form incrustation in Cornish, cylindrical tubular, or other boilers in such a manner that the apparatus employed for purifying the feed-water can be arranged within the boiler, thus relieving such apparatus from the injurious pressure otherwise exerted on the same by the steam. The said apparatus, which is shown in the accompanying drawings as used in connection with Cornish and cylindrical tubular boilers, and the method of freeing the said feed-water from its impurities, are somewhat analogous to the method and apparatus described in the specification of former Letters Patent dated February 2, 1883, No. 272,347.

Figure 2:
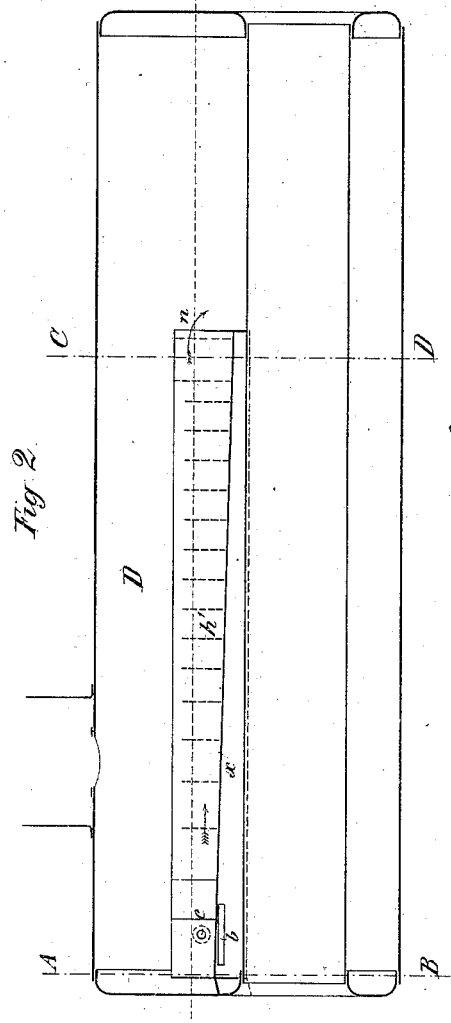
Figure 3:
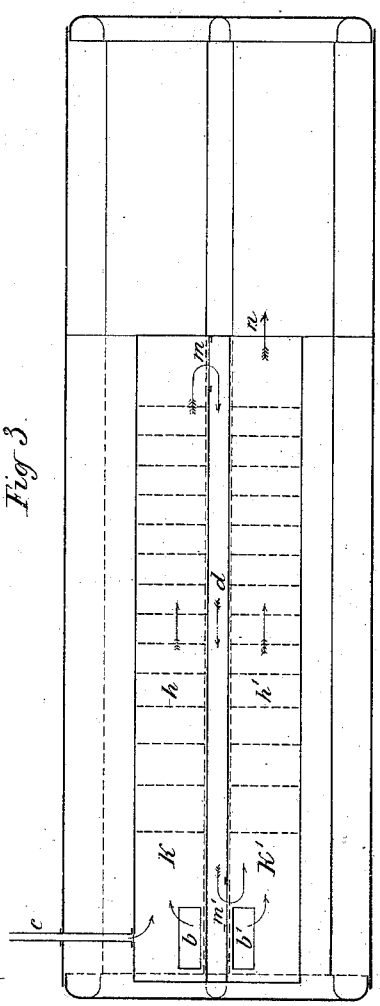
Figure 1:
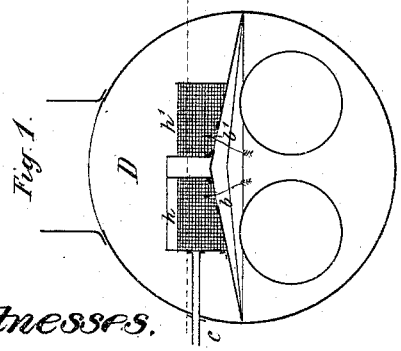
Figure 4:
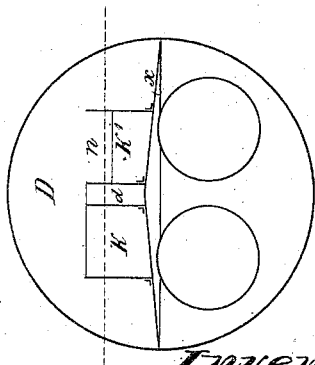

In the accompanying drawings, Figure 1 is a transverse vertical section on the line A B, Fig. 2, through a Cornish boiler embodying the present improvements. Fig. 2 is a longitudinal vertical section through the said Cornish boiler, showing the manner of arranging the apparatus within the boiler. Fig. 3 is a horizontal longitudinal section of the same. Fig. 4 is a transverse vertical section on the line C D, Fig. 2. Figs. 5, 6, and 6$^a$, as well as Figs. 7, 8, and 8$^a$, show modified arrangements of the said apparatus in Cornish and cylindrical tubular boilers, Figs. 5 and 7 being vertical longitudinal sections, Figs. 6 and 8 horizontal longitudinal sections, and Figs. 6$^a$ and 8$^a$ vertical transverse sections. Figs. 9, 10, 11, 12 illustrate another modified arrangement of the said apparatus as applied to a cylindrical tubular boiler, the tubes not being shown in the drawings. Fig. 9 is a vertical transverse section through the said boiler provided with an improved purifying apparatus of square shape. Fig. 10 is a vertical longitudinal section, and Fig. 11 a horizontal longitudinal section, of Fig. 9; and Fig. 12 is a vertical transverse section through such boiler provided with a modified cylindrical purifying apparatus arranged therein in an inclined position.

In Figs. 1, 2, 3, 4, D represents a Cornish or similar boiler, and $x$ $x$ are plates of iron or other suitable material so arranged in the front part of the said boiler as to form inclined surfaces, and touching the front and side walls of the boiler and meeting near the axis of the latter, where the said plates are united so as to form a ridge inclining downward toward the sides of the boiler, and to divide the greater portion of the front of the latter into a lower water-chamber and an upper steam and water-chamber. On the upper side of the partition (formed as above described by the plates $x$) are mounted the open boxes or depositing-chambers K K', provided with the perforated or sieve-like plates $h$ $h'$, substantially as described in the said former specification, the fresh feed-water first entering the box or chamber K by means of the feed-water inlet-pipe $c$. The two adjoining walls of the chambers K K' being a short distance from each other, an open intermediate space, $d$, is formed, by means of which the rear end of the chamber K communicates with the front end of the chamber K'. The inclined partition $x$ is near its front end provided with openings $b$ $b'$ to allow the steam generated below the said partition, and rising or moving toward the front part of the boiler, by following the upward direction given it by the said partition, to enter the chambers K K' through the openings $b$ $b'$, the said steam carrying at the same time some of the water from the water-chamber of the boiler along with it. The feed-water entering the box or chamber K through the inlet $c$ opposite to the aperture $b$ is thus met by the mixture of steam and water rising through the aperture $b$, and is forced through the perforated or sieve-like plates $h$ of the said chamber; thence passing through the aperture $m$ into the connecting-space $d$, and thence through the aperture $m'$ into the second chamber, K', where it is again met by the mixture of steam and water entering this chamber at $b'$, and forced through the perforated plates $h'$ of the said second chamber K'. After having thus been freed from its impurities it leaves the said chamber K' at $n$, entering the boiler D at the water-level. For this purpose the rear end wall of the chamber, K' at $n$ is made a little lower than the lowest water-level in the boiler D, while the rear end wall of the chamber K extends above the highest water-level therein. By reason of the inclined position of the partition $x$ the steam-bubbles generated in the boiler are caused to move toward the front part of the latter, and to force their way upward through the apertures $b\ b'$, the circulation being so strong as to prevent the fresh feed-water from entering the water-space of the boiler D directly through the apertures $b\ b'$, but forcing it to pass through the chambers K K' and the plates $h\ h'$, or other suitable means provided therein for retaining the impurities. The said chambers may be made partly or wholly open at their upper sides.

The partition $x$, instead of being inclined laterally on both sides, may, if desired, be inclined longitudinally only, and its edges on both sides be simply bent downward, which will suffice to give the bubbles of steam rising in the water space of the boiler the desired direction. It is, moreover, immaterial in some cases whether the partition touches the front wall of the boiler or not, as the utilization of only part of the steam-bubbles generated may be sufficient to thoroughly divide the feed-water and force it through the plates in the chambers K K'.

Figs. 5, 6, and $6^a$ represent an arrangement similar to that shown in the preceding figures, the principal difference being that the intermediate space (marked $d$ in the preceding figures) between the two chambers K and K', is here made much wider, so as to form a chamber which is marked $K^2$, and which has perforated or sieve-like plates $h^2$, and is provided near its rear end opposite to the inlet $m$ with an aperture, $b^2$, which is made in that part of the partition $x$ forming the bottom of the said chamber $K^2$. This part of the partition $x$, or the bottom of the chamber $K^2$, is inclined in an opposite direction to the other plates of the said partition $x$, which form the bottoms of the chambers K and K'.

The object of inclining the part of the partition below the chamber $K^2$ differently from the other parts is to cause the bubbles of steam generated in that part of the water-space directly below the said chamber $K^2$ to take their course in a direction opposite to that of the steam-bubbles generated below the chambers K and K', so as to enter the chamber $K^2$ at $b^2$, and there to meet the current of feed-water entering from the chamber K at $m$, and thus force the said feed-water through the plates $h^2$ of the chamber $K^2$ before allowing the same to enter the chamber K' at $m'$.

In Figs. 7, 8, and $8^a$ the partition is formed of several plates, $x$, inclined in the same direction and having openings at $b\ b'\ b^2$, by which arrangement the feed-water is likewise repeatedly met by the steam-bubbles and forced through the perforated plates $h\ h'\ h^2$ of the chambers K K' $K^2$, the said chambers in this case being arranged in line, or one behind the other, instead of being placed side by side as in the preceding figures. The fresh feed-water, entering the chamber K at $c$, is met by the mixture of steam and water entering at $b$, and subsequently passing with the said mixture into the chambers K' and $K^2$ at $m$ and $m'$, is met again by the steam-bubbles arising at $b'$ and $b^2$, respectively, and thus forced through the perforated plates (or other suitable means for retaining the impurities) of the several chambers in the manner above described until it is discharged at $n$ into the water-space of the boiler D.

In order to prevent the water from flowing out of the open chambers K K' $K^2$, and at the same time to more effectually separate the steam and water entering from below, it is deemed preferable to provide horizontal plates of corrugated sheet metal above the apertures $b\ b'\ b^2$.

Figs. 9, 10, 11, and 12 show a modified arrangement of the apparatus as applied to a cylindrical tubular boiler.

D represents the said boiler, which communicates, by means of the pipes $b$ and $e$, with the heating-tubes, which are not shown in the drawings.

This apparatus for freeing the feed-water from its impurities consists, essentially, of the open chambers K K', mounted within the said boiler D, and thus prevented from being subjected to an unbalanced steam-pressure. The said chambers K and K' communicate directly with the pipe $b$, which, by means of a partition, $u$, is divided near its upper end into two ports or inlets, $b\ b'$, Fig. 9, so that the mixture of steam and water rising through the pipe $b$ from the heating or boiler tubes will enter the chamber K through the inlet $b$ and the chamber K' through the inlet $b'$.

$d$ is the pipe connecting the two chambers K and K' in the same manner as hereinbefore described with reference to Figs. 1, 3, and 4. The fresh feed-water enters the chamber K through the inlet-pipe $c$, is met by the mixture of steam and water entering from the boiler-tubes through the inlet $b$, and is carried through the chamber K and the perforated or sieve-like plates $h$ therein, passes thence at $m$ into the pipe $d$, and through the latter at $m'$ into the chamber K', entering this chamber opposite to the mixture of steam and water entering the said chamber at $b'$, and is carried through this chamber in the same manner until it is discharged through the outlet $n$ into the boiler D at or near the water-level therein. The cylindrical boiler D, being in this case connected with its heating or boiler tubes (not shown) by means of a pipe, $e$, the feed-water discharged through the outlet $n$ passes through the said pipe $e$ into the heating-tubes below.

It is not necessary that the pipe *b* should communicate directly with the chambers K and K'. It may, if desired, extend into an open funnel projecting from the bottom of the said chambers and divided into two separate ports by the partition *u*, above referred to, tight joints not being required where the circulating mixture enters the chambers from the heating-tubes through the pipe *b*. In Fig. 12 the arrangement is modified inasmuch as the the partition *u* is omitted, and the inlets *b* and *b'* are formed by pipes, the operation being entirely the same as that above described.

Instead of a repeated circulation through the several chambers serving for retaining the deposits of the impurities, the feed-water may, if desired, be forced through one of the chambers only. In this case the intermediate wall between the chambers K and K' would be omitted, and the rear end wall of the chamber K provided with an outlet, as at *n*, in the chamber K'.

As regards the advantages of the arrangements shown, it may be mentioned that, as above stated, the apparatus for freeing feed-water from its impurities, by being mounted inside the boiler, is not subjected to the heavy unbalanced steam-pressure due to the former arrangements, and that, consequently, the said apparatus may be constructed of comparatively thin sheet metal or other material, and requires no steam or water tight joints.

Having thus described my invention, what I claim as new, and desire to secure by Letters Patent, is—

1. The combination, with the boiler D, of the feed-water depositing and purifying chamber containing perforated plates, and arranged within the boiler, and having communication with the water and steam spaces thereof, and a feed-water pipe passing through the boiler and entering the depositing and purifying chamber, so that the feed-water entering the chamber through the feed-water pipe is met by a mixture of steam and water from the boiler and forced through the perforated plates for delivery from the chamber to the water-space of the boiler, substantially as described.

2. The arrangement of the depositing-chambers having perforated plates or other suitable means for retaining the impurities on top of the partition-plate *x*, arranged in an inclined position within the steam and water space of the boiler, and having openings, as at *b*, which arrangement causes the steam-bubbles generated in the boiler below the said partition-plate to move to one or more definite points and to enter the said depositing chamber or chambers opposite to the feed-water, so as to force the latter through the said plates, or other means for retaining the impurities, substantially as and for the purpose specified.

3. The depositing-chambers having the perforated plates or other suitable means for retaining the impurities, and being open above the water-level so as to communicate freely with the steam-space of the boiler, while only the open rear end of the last of the said chambers communicates with the water-space, the feed-water entering one chamber from the preceding chamber by means of a connecting-pipe, *d*, so as to be repeatedly met by the steam-bubbles, and passed through the said perforated plates or other means for retaining the impurities, substantially as and for the purpose specified.

In testimony whereof I have signed my name to this specification in the presence of two subscribing witnesses.

HEINRICH STOLLWERCK.

Witnesses:
  TH. TEILMANN,
  SAMUEL SPACKMAN.